(12) United States Patent
Eshbach, Jr. et al.

(10) Patent No.: US 6,676,799 B2
(45) Date of Patent: Jan. 13, 2004

(54) METHOD FOR MAKING METALLIZED DECORATIVE LAMINATE

(75) Inventors: John R. Eshbach, Jr., Lititz, PA (US); Timothy D. Colyer, Lancaster, PA (US); Christopher K. Moore, Bourbonnais, IL (US)

(73) Assignee: Armstrong World Industries, Inc., Lancaster, PA (US)

( * ) Notice: Subject to any disclaimer, the term of this patent is extended or adjusted under 35 U.S.C. 154(b) by 0 days.

(21) Appl. No.: 10/143,178

(22) Filed: May 10, 2002

(65) Prior Publication Data

US 2003/0143383 A1 Jul. 31, 2003

Related U.S. Application Data

(60) Provisional application No. 60/352,959, filed on Jan. 29, 2002.

(51) Int. Cl.$^7$ ................................................. B32B 31/04
(52) U.S. Cl. .................... 156/324; 156/209; 156/219; 156/220; 428/457; 428/461
(58) Field of Search ................. 156/209, 219, 156/220, 324, 157; 428/457–472.3, 148; 427/132

(56) References Cited

U.S. PATENT DOCUMENTS

| | | | | | |
|---|---|---|---|---|---|
| 3,616,192 | A | * | 10/1971 | Sinclair | 428/13 |
| 3,630,819 | A | * | 12/1971 | Conger | 428/160 |
| 3,660,200 | A | * | 5/1972 | Anderson et al. | 156/278 |
| 3,668,034 | A | * | 6/1972 | Nicholas et al. | 264/241 |
| 3,811,989 | A | * | 5/1974 | Hearn | 428/122 |
| 4,022,943 | A | * | 5/1977 | Erb et al. | 428/159 |
| 4,210,693 | A | * | 7/1980 | Regan et al. | 428/152 |
| 4,235,949 | A | * | 11/1980 | Van Manen et al. | 428/31 |
| 4,275,099 | A | * | 6/1981 | Dani | 428/31 |
| 4,483,732 | A | * | 11/1984 | Penta et al. | 156/247 |
| 5,055,343 | A | * | 10/1991 | Murphy | 428/209 |
| 5,077,112 | A | * | 12/1991 | Hensel et al. | 428/76 |
| 5,505,808 | A | * | 4/1996 | Hallman et al. | 156/233 |
| 5,543,232 | A | | 8/1996 | Ehrhart et al. | 428/482 |
| 5,719,227 | A | | 2/1998 | Rosenberry et al. | 524/590 |
| 5,843,576 | A | | 12/1998 | Rosenberry et al. | 428/423.1 |

* cited by examiner

*Primary Examiner*—Jeff H. Aftergut
*Assistant Examiner*—Jessica Rossi

(57) ABSTRACT

Disclosed is both a product and method relating to a decorative metallized laminate. The laminate comprises a substrate and at least two laminated films, wherein one of the films is a metallized film. The method comprises a dual film continuous dual laminating process for producing a metallized laminate.

15 Claims, 2 Drawing Sheets

METHOD FOR MAKING METALLIZED DECORATIVE LAMINATE

RELATED APPLICATION

This application is a non-provisional application claiming the benefit of Provisional Application Ser. No. 60/352,959, filed Jan. 29, 2002, the content of which is hereby incorporated in its entirety.

FIELD OF THE INVENTION

The present invention relates to decorative laminates and in particular to metallized decorative laminates.

BACKGROUND

Resilient flooring coverings, which include for example vinyl tiles and vinyl sheet, are often used as decorative surface coverings. Decorative surface coverings can be made from composite materials which comprise a transparent or translucent wear (upper) layer, a decorative layer such as a printed patterned layer and one or more backing (lower) layers. The wear layer of a resilient vinyl floor covering can comprise PVC compositions, which can include PVC film, which can be back printed with a pattern. Additionally, other polymer films or transparent layers can be used depending upon product construction. The decorative layer can comprise patterns of any type, which can include printed designs or chip containing layers. A backing layer adjacent such a printed patterned layer commonly contains one or more white or other colored pigments to enhance the appearance of the printed patterned layer as seen through the wear layer. When the resilient floor covering is a tile product, this type of backing layer may be called a face ply.

In the formation of various decorative surface coverings it has been desirable to provide a reflective surface covering. Typically, the reflective surface covering comprises a metal film. Various methods have been suggested for producing a decorative surface covering containing reflective elements. One such method is the lamination of a metallized mylar sheet to a backing, printing a design on the surface of the metallized sheet and then applying a transparent top coating. Another method has been the application of an adhesive to portions of a backing sheet, applying metallic chips onto the sheet and then covering with a transparent top coating. The difficulty in such processes is obtaining good adhesion between the top layer and backing layer with the metallized areas. Further, aging or continued stressing in use causes a weakening or complete destruction of adhesion.

What is desired is a laminated metallized flooring that may have a printed pattern and/or a subsurface embossed design on a continuous metallized film that promotes good adhesion between the film and the other components of the laminate structure.

SUMMARY

The present product and method relate to a metallized decorative laminate. The metallized laminate comprises a substrate having at least two laminated films, wherein one of the films is a metallized vinyl film. The method comprises a dual film process of forming the metallized laminate. The process may be continuous.

In one embodiment, a method of manufacturing the metallized decorative laminate comprises the steps of laminating a substrate, a metallized film and a second film to form a metallized laminate. Essentially, the metallized film can be laminated to the substrate to form a laminated face and then the second film can be laminated to the laminated face. Typically, the laminated metallized film comprises a vinyl film, a thin metal layer and a key coating. The thin metal layer is typically vacuum deposited onto the vinyl film. Furthermore, the metallized film may be mechanically embossed with an embossed design such that the thin metal layer is textured during lamination. A printed design may also be printed on the backside of the second film.

In another embodiment, the metallized film is mechanically embossed prior to lamination to the substrate and the second film. Optionally, the mechanically embossing of the metallized film can be done after lamination to the substrate, but before the lamination of the second layer.

The metallized decorative laminate may comprise a substrate having a facing side, a metallized film laminated to the facing side of the substrate and a second film laminated to the metallized film.

In one embodiment, the metallized film comprises a vinyl film having a thickness between about 1 mil to about 10 mils and a metal layer having a thickness between about 0.2 microns to about 30 microns which is vacuum deposited onto the vinyl film. A key coating may also be applied to the metal side of the metallized film. Additionally, the metallized film may have a mechanically embossed image imparted to its surface. The second film can include a printed pattern, and a surface texture may be embossed in register onto the metallized laminate in register with the printed pattern. Furthermore, the second film may have a protective top coat.

DETAILED DESCRIPTION

Figure 1:
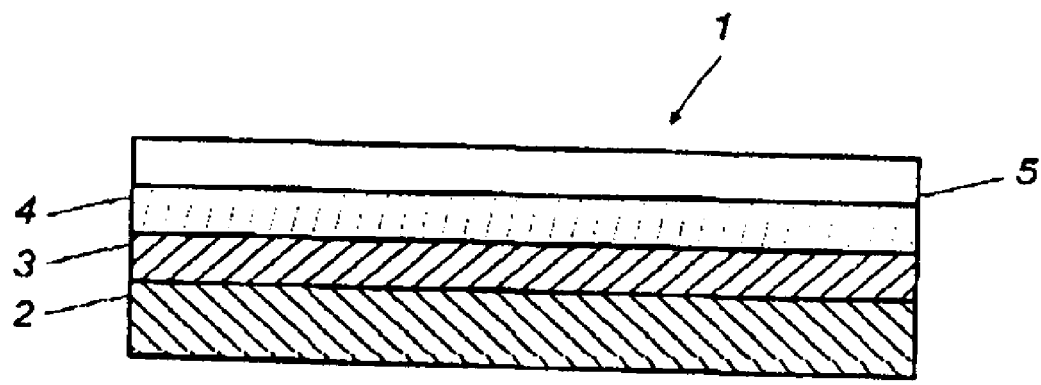
FIG. 1 illustrates a cross section of the metallized decorative laminate.

The present invention includes both a metallized decorative laminate and a method for making the metallized decorative laminate. The metallized decorative laminate comprises a substrate having a facing side with a metallized film laminated to the facing side of the substrate and a second film laminated to the metallized film. The method of manufacturing the metallized decorative laminate comprises laminating a metallized film to a substrate to form a laminated face and then laminating a second film with at least regions of translucency or transparency to the laminated face to form a 3-dimensional laminate. The thin metallized layer of the metallized decorative laminate provides an added appearance of depth to the laminate.

When the metallized film is mechanically embossed, it also imparts additional depth perception. In one embodiment, the metallized film is mechanically embossed on the vinyl face. In this case, the mechanical embossing conditions can be selected to emboss the metallized layer as well as the vinyl layer, if desired. Optionally, if desired, the surface of the metallized layer can be mechanically embossed either prior to application of a key coat or with the key coat present.

The metallized film portion of the present laminate may be comprised of three separate layers. Of course, other embodiments are contemplated with the metallized film comprising less than three layers or more than three layers. In the embodiment with three layers, the first layer may be comprised of a vinyl film. Typically, the vinyl film is a rigid vinyl film. The second layer comprises a thin layer of metal, typically having a thickness between about 0.2 microns to about 30 microns. The thin layer of metal may be applied to the vinyl film by a vacuum deposition process. The metal layer may be comprised of aluminum, but most any metallic or reflective substance may be used for the metallic layer. In an embodiment, a mirror like appearance is obtained when aluminum is used. The third layer is a key coat applied to the metal side of the film to provide a good bonding surface for the metal side of the metallized film so that the metallized film can be laminated to the base material at the first lamination station. Key coats or adhesion promoting layers are well known in the art and can include modified acrylic polymers, acid modified vinyl chloride/vinyl acetate copolymers, and others. The only requirement for the key coat is that the key coat provides adequate adhesion during the process and in the product end use, without changing any long-term stability properties of the final product. A particular well-suited metallized film (BMDTXXX) with key coating can be obtained from Rocheux International, 100 Middlesex Aye, Carteret, N.J. 07008.

Furthermore, the metallized film may be mechanically embossed with a pattern and then laminated. When the vinyl face of the metallized film is embossed and the second film subsequently laminated, the mechanical embossing pattern in the vinyl face may be reduced, but the embossing pattern remains visible in the metallic film.

In one embodiment, the process may comprise a continuous belt process similar to a print transfer process through the use of a release paper followed by lamination of a flexible vinyl film. These continuous belt processes may use a back printed vinyl film. The process includes a station for a controlled release carrier, calendared thermoplastic sheet and heaters. A rotogravure design may be printed onto the back of the second vinyl film in an off line operation, thus the print transfer steps may be eliminated. The cooled laminated composite sheet may then be removed from the nondistensible release carrier. The cooled laminated composite sheet may then be conveyed directly to an indexing punch press that cuts out the finished tile to the desired size. Other process options can be envisioned that involve a double lamination of metallized film and an additional clear transparent film. Optionally, the metallized film can be first laminated and embossed on the substrate prior to lamination of the clear second film. Additionally, it is also possible to laminate the two films together before lamination to the substrate.

In greater detail, FIG. 1 illustrates a cross section of an embodiment of the metallized decorative laminate 1. Within the drawing there is illustrated four separate layers comprising the metallized decorative laminate. The embodiment shown in FIG. 1 illustrates only one possible embodiment, thus not all the layers shown are required for the present invention.

The substrate layer 2 comprises the base of the metallized decorative laminate 1. The substrate layer 2 can comprise cushioned or non-cushioned sheets and may be comprised of a limestone filled vinyl resin composition. The substrate layer 2 has a facing and backing side. Affixed to the facing side is a metallized film 3 and affixed to the backing side can be an adhesive coating (not shown) for installing the metallized decorative laminate 1 to a surface.

The metallized film 3 may be formed from a vinyl film. The metallized film 3 is laminated to the facing side of the substrate 2 and can either have a second film 4 laminated to its face, as illustrated in FIG. 1, or a pattern printed directly on its face (not shown). In an alternative embodiment, only a nonprinted topcoat is applied to the metallized film 3.

A second film 4 is illustrated as being affixed to the face of the metallized film 3 in FIG. 1. The second film 4 may be back-printed, such that a pattern is printed on the side of the film to be in contact with the metallized film 3. The second film 4 may be formed from a vinyl film, which is then laminated to the metallized film 3. Additionally, a wear layer or topcoat 5 can be affixed to the facing side of the second film 4 to provide added wear and protection for the metallized decorative laminate 1.

In greater detail, the substrate 2 can be formed of most any vinyl resin and inorganic filler. Typically, the chosen inorganic filler is limestone. It should be understood that most of the substrates normally employed in the surface covering field may be employed to prepare the laminate of this invention so long as the chosen substrate is relatively strong, durable and flexible. The substrate 2 can also comprise multiple component layers. Thus, most any woven, nonwoven, felted or sheet of synthetic or natural material may also be used as the substrate layer 2.

Essentially, the substrate 2 can be formed of a vinyl blend comprising a free-flowing homogeneous mixture of a thermoplastic vinyl resin, vinyl plasticizers, fillers, pigments, and a vinyl stabilizer. The fillers are typically inorganic matter and may include limestone, silica, diatomaceous earth, clay and mixtures thereof.

The resin component of the substrate is typically a vinyl resin. More specifically, the vinyl resin is a polymeric material obtained by polymerizing compounds containing at least one —$CH=CH_2$ radical. Useful vinyl resins include homopolymers, such as polyvinyl chloride, polyvinyl acetate, polyvinyl propionate, polyvinyl butyrate, polymerized vinylidene chloride, polymerized acrylic acid, polymerized ethyl acrylate, polymerized methyl acrylate, polymerized propyl acrylate, polymerized butyl acrylate, polyethylene, polypropylene, and the like; copolymers of the above with each other such as vinyl chloride-vinyl acetate copolymer, vinylidene chloride-vinyl chloride copolymer, methyl methacrylate-vinyl chloride copolymer, methyl acrylate-ethyl acrylate copolymer, ethyl acrylate-butyl acrylate copolymer, ethylene propylene copolymers, ethylene styrene copolymers, and the like and copolymers of the above with other monomers copolymerizable therewith, such as vinyl esters, including vinyl bromide, vinyl fluoride, vinyl chloroacetate, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, chlorostyrene, coumarone, vinyl pyridine and the like; maleic and fumaric acid and their derivatives such as diethyl maleate, dibutyl fumarate and the like; unsaturated hydrocarbon such as ethylene, propylene, butylene and the like; allyl compounds such as allyl acetate, allyl chloride, allyl ethyl ether, and the like; conjugated and cross-conjugated unsaturated compounds such as butadiene, isoprene, chloroprene, 2,3-dimethylbutadiene-1,3, divinyl ketone and the like. The monomers listed above are useful in preparing copolymers with a vinyl resin and can be used as modifiers in the polymerization, in which case they may be present in an amount of a few percent, or they can be used in larger quantities, up to as high as 40 percent by weight of the mixture to be polymerized.

A plasticizer for the vinyl resin may be added to the vinyl resin of the substrate. Suitable plasticizers for the vinyl resin include ester type plasticizers such as tributyl phosphate, dioctyl phthalate, dipropylene glycol dibenzoate, phenyl phosphate, dibutyl tartrate, amyl tartrate, butyl benzyl benzoate, dibutyl sebacate, dioctyl adipate, didecyl adipate and the like, rubbery plasticizers, such as butadiene-styrene copolymer, butadiene-acrylonitrile copolymer, ethylene vinyl acetate (EVA), and the like, and other materials which function as plasticizers, such as epoxidized drying oils, aromatic hydrocarbon condensates and the like. Where certain flexible soft vinyl resins are used, such as polymers containing large proportions of ethyl acrylate, no plasticizer is needed.

The metallized film may be formed from most any plastisol, organosol, or melt processed vinyl resin material. For example, the plastisol or organosol may be a thermoplastic polymer or homopolymer of polyvinyl chloride, a copolymer of polyvinyl chloride and one or more other co-polymerizable resins, a block polymer of polyvinyl chloride and one or more other co-polymerizable resins, a graft polymer of polyvinyl chloride and one or more other co-polymerizable resins. Additionally, an acrylic resin capable of being dispersed into a plastisol may be included. Melt processable materials can include homopolymers or copolymers of polyvinyl chloride, a polyamide, a polyester, polyolefins such as ethylene, propylene or polystyrene, a polycarbonate, and an acrylic. The metallized film may have most any thickness that is practical for application The second film 4 can be a back-printed film, wherein the inked side of the film is in contact with the metallized film. The second film is laminated to the metallized film and is comprised of a substantially clear acrylic or polyvinyl chloride film having a printed pattern. The composition of the second film is not limited, and second films such as polyester, polyolefin, etc. can be used, depending upon compatibility with the substrate and metallized film composition. In an alternative embodiment, the film may also contain pigments. Pigmentation is limited to colorations that do not substantially obscure the printed matter on the film. The nonprinted side of the second film can perform as the wearlayer in the final product structure, or in a further embodiment, the second film further contains a topcoat on the non-printed side of the film. The composition of the topcoat is not limited, but may be formed from compositions such as those described in U.S. Pat. Nos. 5,843,576 and 5,543,232, and 5,719,227, which are incorporated herein by reference.

In an alternative embodiment, a printed pattern may be printed directly onto the surface (face) of the metallized film. The pattern can be printed before the metallized film is laminated to the substrate or after lamination. A wear layer can be subsequently directly applied or laminated to the printed facing side of the metallized film.

Figure 2:
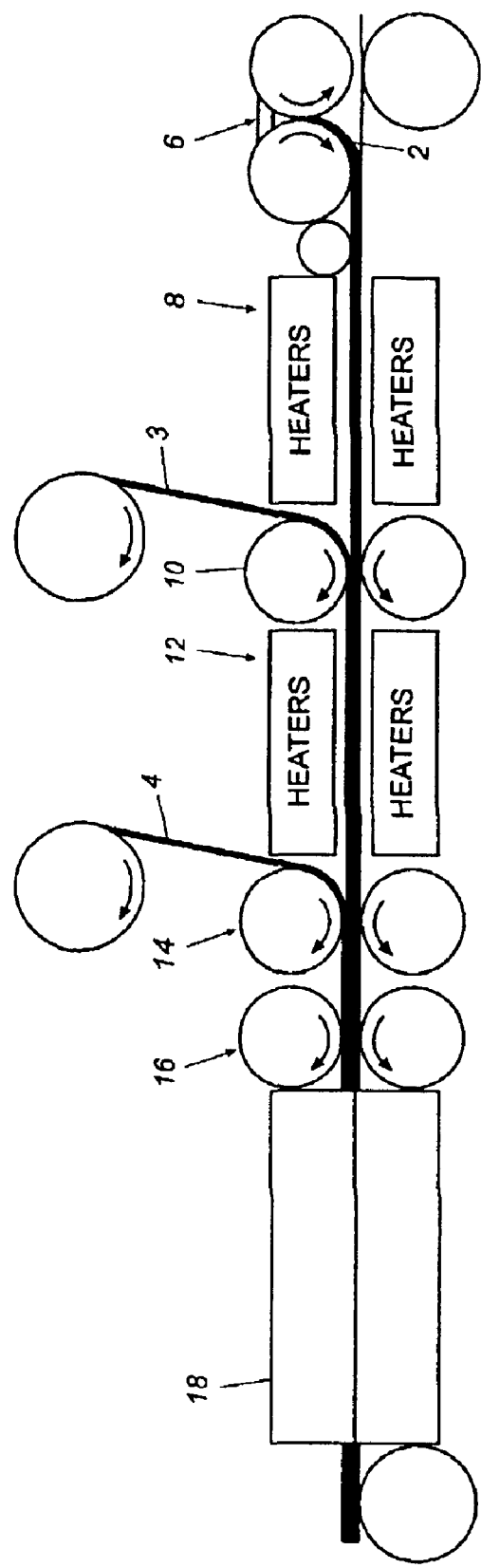
FIG. 2 illustrates an apparatus and method for creating the metallized decorative laminate.

Illustrated in FIG. 2, a method and apparatus are described for creating a metallized decorative laminate of the present invention. The illustrated process comprises two separate lamination steps. Within the lamination process it is contemplated that adhesives may be applied if desired, but adhesives are typically not necessary for most plastics. The first lamination step comprises laminating the metallized film 3 to the substrate 2 and the second step comprises laminating the second film 4 to the embedded film 3. Once laminated, the metallized decorative laminate can be embossed and punched into decorative tiles.

In greater detail, the substrate layer 2 is formed in the mill 6. A heated fluxed mixture of vinyl resin and limestone filler is placed on mill 6 to form a substrate sheet, which is then heated to a temperature between about 275° F. to about 325° F. in a set of heaters 8. The heaters 8 can be of any radiant devise, gas, or other heat source. Once heated, the substrate 2 is laminated with the metallized film 3 in the first lamination station 10. Once laminated, the laminated substrate is then heated again in a second set of heaters 12 to a temperature between about 275° F. to about 325° F. Once heated, the laminated substrate is then laminated with the second film 4 in a second lamination station 14. After the second lamination station 14, the metallized decorative laminate may then be embossed with a desired design before the laminate cools. The laminate is embossed mechanically using various embossing rollers 16. This embossing can be in-register with the print pattern or an overall embossing texture. Once embossed, the laminate can be cooled in a water bath 18 and then punched into decorative tiles by a punch press. The above example is given to illustrate one embodiment of creating the metallized decorative laminate 1. It is recognized that there can be additional steps added to the described process, including the step of printing a pattern directly on the metallized film 3 instead of laminating the second film 4 or in addition to the second film 4. Additionally, if a cushioned sheet substrate 2 is employed, chemical as well as mechanical embossing techniques and processes can be employed. In such event, the substrate may further include a chemically embossable foamable layer having a printed pattern containing chemical embossing inhibitors, accelerators or combinations of inhibitors and accelerators to impart a texture into the metallized laminate.

While specification embodiments have been set forth as illustrated and described above, it is recognized that variations may be made with respect to disclosed embodiments. These can include other known continuous or discontinuous process variations, as well as the use of compatible adhesive layers in the lamination processes. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A method of manufacturing a metallized flooring laminate comprising the steps of:
    laminating a substrate to a first side of a metallized film and a second film to a second side of the metallized film opposite the substrate to form a metallized laminate, the metallized film comprising a rigid vinyl film and a metallized layer.

2. The method of claim 1, wherein the lamination step is continuous.

3. The method of claim 1, wherein the metallized layer is vacuum deposited onto the vinyl film.

4. The method of claim 1, wherein the method includes applying a key coat to the metallized film.

5. The method of claim 1, further including mechanically embossing the metallized film.

6. The method of claim 1, further comprising printing a pattern onto a back side of the second film.

7. The method of claim 1, further comprising applying a protective top coat to the second film.

8. The method of claim 1, wherein the substrate further comprises a chemically embossable foamable layer having a printed pattern containing a chemical embossing agent selected from the group consisting of inhibitors, accelerators and combinations thereof whereby a texture can be imparted to the metallized laminate.

9. The method of claim 1, wherein the laminating step comprises the application of pressure to the substrate, metallized film and second film by lamination rolls.

10. The method of claim 1, further including mechanically embossing at least one surface texture onto the metallized laminate.

11. The method of claim 10, wherein the second film comprises a printed pattern, and further including embossing the surface texture onto the metallized laminate in register with the printed pattern of the second film.

12. The method of claim 1, wherein the metallized film is laminated to the substrate to form a laminated face.

13. The method of claim 12, wherein the second film is laminated to the laminated face.

14. The method of claim 13, wherein the metallized film is mechanically embossed prior to laminating the substrate, metallized film and second film to form the metallized laminate.

15. The method of claim 14, wherein the laminating step comprises the application of pressure to the substrate, metallized film and second film by lamination rolls, and the mechanical embossing step comprises the application of pressure to the metallized film by embossing rolls.

* * * * *